April 24, 1928. 1,666,919

J. H. STEURER

THERMOELECTRIC TRANSFORMER

Filed June 25, 1925

John H. Steurer Inventor

By his Attorney
Louis Prevost Whitaker

Patented Apr. 24, 1928.

1,666,919

UNITED STATES PATENT OFFICE.

JOHN H. STEUBER, OF ROCKVILLE CENTER, NEW YORK, ASSIGNOR OF ONE-HALF TO LOUIS CHARLES HENKEL, OF ROCKVILLE CENTER, NEW YORK.

THERMOELECTRIC TRANSFORMER.

Application filed June 25, 1925. Serial No. 39,585.

My invention consists in the novel features hereinafter described, reference being had to the accompanying drawings, which illustrate one embodiment of the invention selected by me for purposes of illustration, and the said invention is fully disclosed in the following description and claims.

The object of my invention is to provide a convenient and reliable apparatus for transforming the usual commercial lighting and power current, such as is furnished in cities, for example, and ordinarily of 110-volt A. C. or D. C., into direct current of required voltage or voltages, such as is ordinarily furnished by galvanic batteries or small storage batteries operating electrical apparatus of various kinds.

In the specific form of my invention I provide means for transforming the house current, whether A. C. or D. C. into direct current of the required voltages for supplying the necessary filament heating current, plate current and grid biasing current in connection with radio receiving sets transmitters, and other apparatus which employ vacuum tubes. A concrete device embodying my invention may supply, for example, a voltage up to six volts for heating the filaments of the vacuum tube, a voltage from 22½ to 90 volts, for example, for supplying the plate current to a detector and amplifying tubes, and a voltage of 2½ to 4 volts, for example, for use as a grid biasing current, and the device may provide anyone or more, or all three or these features in a single apparatus.

In carrying out my invention I employ the well known thermo electric action of heat applied to the junction of dissimilar metals, such as a copper-nickel alloy and iron, the heating action being obtained by passing the power or house current through a heating element adjacent to the meeting ends of the united metals and providing for radiation of the heat therefrom, so that the opposite ends of the couples shall preserve a much lower temperature. My invention also contemplates the employment of regulating means for controlling the voltage output of each apparatus or each section of each apparatus if the device is arranged to provide current for several uses, as will be desirable in connection with radio receiving sets. My invention also comprises the novel features of construction and combination of parts hereinafter described, whereby the entire device may be made up in such compact form and provided with such means for securing the radiation and dissemination, that the device may be used practically in the same manner and locations as the ordinary dry cell batteries which it is designed to displace, even to the extent of permitting the device to be incorporated within a radio receiving set, for example, to the end that by simply connecting the device to the house current in the same manner as an ordinary electric light bulb is connected, the proper currents of required voltage are available whenever the power current is turned on, and the renewal of galvanic batteries and the recharging of storage batteries is entirely eliminated without consequential expense and annoyance.

Referring to the accompanying drawings.

Figure 2:
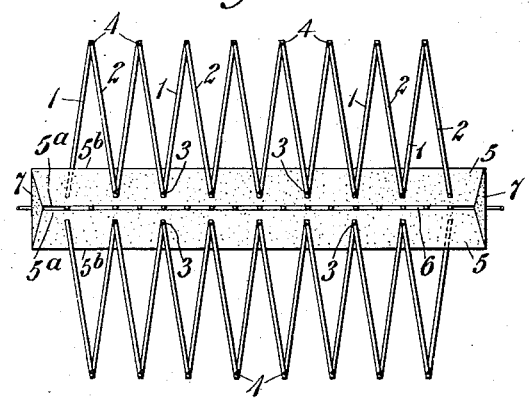
Fig. 2 is a detail sectional view of the generating element.
Figure 4:
Fig. 4 is an enlarged detail view of several thermo electric couples detached.

Referring to the drawings, I have shown in Fig. 4 an enlarged detail view of one form of couple which I conveniently employ to carry my invention into effect, consisting of a piece or strip of copper-nickel alloy, indicated at 1, and a similar strip of pure iron indicated at 2. I do not desire to be limited to the particular metals herein mentioned, as other combinations of dissimilar metals may be employed in a similar manner, but I have found that these metals are advantageous. The metal is preferably used in the form of an extremely thin and narrow strip having a very small cross section so as to radiate heat rapidly and effectually, so that considerable difference in temperature may be maintained between the cold and hot junctions without the use of auxiliary cooling means. I may employ wire or other form of metal if desired. In forming the couples, I take a strip of the copper-nickel alloy, 1, and a strip of iron, 2, for example, and weld their ends together at 3. I then take another strip of copper-nickel alloy and weld it to the opposite end of the iron strip, 2, as indicated at 4, and so on, making a zigzag construction of any desired length. In order to support the strips of couples, of which there will be a large number in each device, and at the same time insure their proper heating adjacent to one end or welded joint of each couple, and at the same time provide for proper radiation in order to maintain a different temperature at the opposite ends of the couples, I prefer to imbed strips of couples adjacent to one end of each, as 3, of Fig. 2, in a body of heat resisting material or refractory compound, such as fire clay, asbestos, etc., indicated at 5, leaving the ends, 4, projecting to a considerable extent from the material, 5, to afford opportunity for proper radiation. In practice I prefer to mold the insulating refractory material in the form of a block, as herein indicated, in which the respective strips of couples are imbedded while the material is plastic, so that the imbedded welded connections, as 3, for example, extend to very near one face of the block, as the face, 5ª, leaving only sufficient refractory material between the ends, 3, of the couple, and the face, 5ª, to provide insulation from an electric heating element, while insuring the greatest possible heating effect therefrom at the adjacent ends of the couple. The couples project from the opposite face, 5ᵇ, to a very considerable extent, leaving only a very small portion of each couple imbedded in the refractory material or block. This block, or refractory materials, serves to hold the couples in position and also to concentrate the heat at the hot junctions, in this instance, 3, and to insulate the hot junctions from the heating element.

Figure 1:
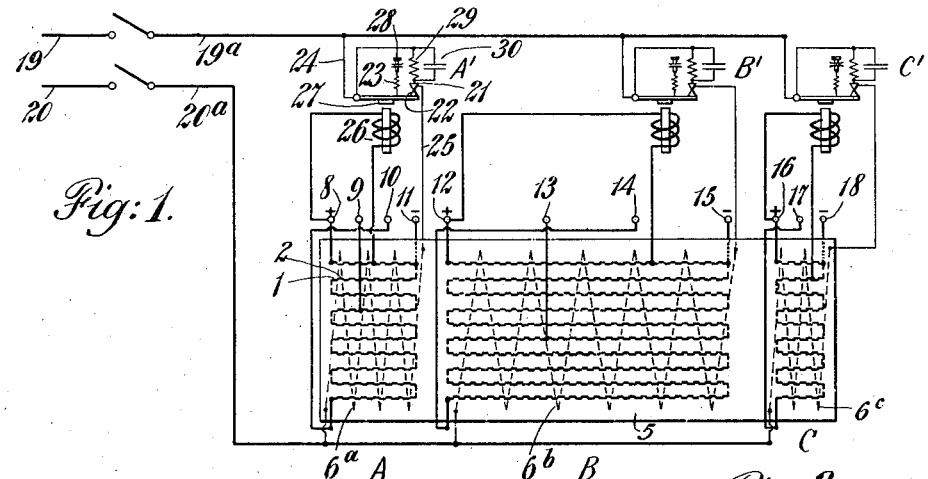
Fig. 1 represents a circuit diagram of an embodiment for providing current for filament lighting, plate current and grid biasing current, and showing independent regulating means for the separate sections of the device.

In order to gain the greatest degree of efficiency I prefer to bring together two of such blocks with their faces, 5ª, and to place between the faces, 5ª, the heating element indicated at 6, which may be either of the wire type or other type, such as the carbon granule type. The two blocks, 5, will then be united as by cementing their edges, as indicated at 7, or they may be secured in any other desired manner. It will be understood that the rows or strips of couples will be interconnected in any desired manner, so as to connect up a sufficient number of couples in series, or series parallel to give the desired maximum voltage. In Fig. 1, for example, I have shown the strips of couples arranged in three groups, the couples of each group projecting from both sides of the blocks, 5, 5. The couples of the first group, indicated at A, are all interconnected in series and are of sufficient number to produce a maximum of six volts for use in filament lighting.

I have shown a series of binding posts indicated at 8, 9, 10 and 11. 8 and 11 being the plus and minus terminals and 9 and 10 being connected with taps by which lower voltages, such as 4½ and 3, for example, or 3 and 2, may be obtained from the same group. Group B, in Fig. 1, represents a larger number of couples connected in series and capable of producing say 90 or 100 volts, for use in the plate circuit in place of the ordinary B battery. This section is shown provided with binding posts indicated at 12, 13 and 14 and 15, of which 12 and 15 are the plus and minus terminals and 13 and 14 are connected with taps for, say 22½ volts and 67½ volts, respectively, to supply the voltage for the detector tubes and amplifiers. I have also shown in the same blocks a third series of couples indicated at C, also connected in series but of smaller number than those shown in the groups, A and B, which supply the grid biasing current, and this group is provided with binding posts 16, 17 and 18, of which 16 and 18 are the plus and minus terminals. This group, ordinarily designed to produce, for example, a maximum of 4½ volts, or any other desired voltage, is shown provided with the intermediate binding posts, 17, which is connected with a tap for taking off say 2½ or any desired number of volts, as may be preferred. While I have shown in Fig. 1 these three groups of couples arranged in unitary blocks, 5, 5, it is obvious that each group could be made up separately if this were found to be desirable. I prefer, however, to employ the arrangement shown in Fig. 1. In order to maintain the voltages of the several groups of couples constantly, I provide means for regulating the heat current which, as indicated in Fig. 1, is supplied by wires, 19 and 20, and from any suitable source and may be of any desired voltage for which the apparatus is constructed. As a matter of practice at the present time, 110 volts house current will ordinarily be employed and this may be A. C. or D. C., the output of the apparatus being invariably direct current, no matter which form of heating current is employed. In the present instance, therefore, I have arranged the heating elements, indicated at 6ª, 6ᵇ and 6ᶜ, separate from each other and connected between extensions of the power line, indicated at 19ª and 20ª. I have also provided as shown in Fig. 1, a separate electrically operated voltage control device for each group of couples and as the construction and operation of each of these devices is identical, I will describe one in detail.

These devices are indicated as a whole at A¹, B¹ and C¹, respectively. Each of the controlling devices shown in Fig. 1 comprises a pair of separable contacts, indicated at 21 and 22, 22 being the movable contact normally held in closed position by a spring, 23, the movable contact being connected for example to the line wire, 19ª, by the wire, 24, while the fixed contact is connected to the heating element of one of the groups of couples, as by the wire, 25. 26 represents an electromagnet of a voltage relay connected across a series of several couples, preferably on the high voltage side of the series, which gives a very precise terminal voltage control. This relay magnet, 26, is provided with an armature, 27, on a pivoted lever carrying the movable contact, 22, and having the spring, 23, connected therewith. The spring is provided with an adjusting device indicated at 28, so that it can be set for the desired terminal voltage. When the voltage rises above the desired voltage for which the relay is set, the magnet, 26, will separate the contacts, 21 and 22. This may break the circuit altogether, or, as indicated in Fig. 1, may introduce into the circuit through the heating element a resistance indicated at 29, which is my preferred construction. In either case, a condenser, indicated at 30, is preferably shunted across the breaker points to reduce sparking. I have described in detail the construction of the voltage relay control device, A¹, which controls the heating of the couples in group A. It will be understood that the group, B, is provided with a similar control device indicated at B¹, and the group C is provided with a similar control, C¹, so that constant voltages for which the apparatus is designed will be maintained.

Figure 5:
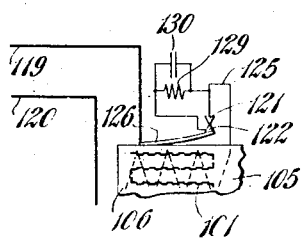
Fig. 5 is a detail view showing a thermostatic switch which may be employed to control the power line and maintain the constant voltage output.

In Fig. 5 I have shown a modified form of regulating device which may be employed instead of the temperature relays, indicated at Fig. 1. In this figure, 105 represents the blocks containing the thermo couples, indicated at 101, and the heating element is indicated at 106. 119 and 120 indicate the power line. In this instance, I provide on one edge of the block, 105, a thermostatic element indicated at 126, which may consist of two strips of dissimilar metal united throughout their length in any desired manner, and carrying the movable contact, 122, which is normally in engagement with the fixed contact, 121, connected by wire, 125, with the heating element. The construction is such that as the temperature rises to such an extent as to unduly increase the voltage of the group or groups of couples carried by the blocks, the thermostatic element, 126, will cause the separation of the contacts 121 and 122 and either break the power current until the temperature falls to the desired temperature to produce the required voltage, or, as I prefer, and as shown in Fig. 5, a resistance, 129, in a shunt circuit, is introduced into the power line. A condenser, 130, is employed across the breaker point to prevent sparking.

Figure 3:
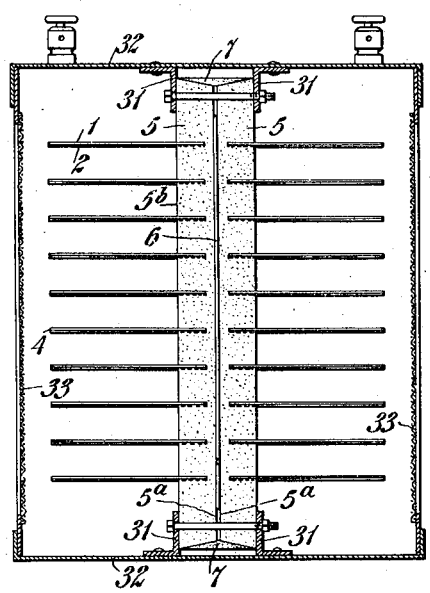
Fig. 3 is a transverse section of the same illustrating a form of casing which may be conveniently employed to enclose the generating element.

In practice I prefer to enclose the generating device in a suitable casing, as indicated in Fig. 3, for example, in which I have shown a casing. In this instance I have shown the upper and lower portions of the blocks, 5, 5, provided at each end with angle irons, indicated at 31, 31, bolted thereto, for example, and to these angle irons I connect a metallic casing indicated at 32, by bolts or screws, said casing being provided on opposite sides, adjacent to the rows of couples extending from the blocks, with perforated or foraminous material, such as wire gauze or perforated metal, indicated at 33, to provide for rapid ventilation in order to secure the proper radiation of heat from the projecting portions of the couples and maintain them at very much lower temperature than the interior portion. I have found in practice that these couples radiate their heat so rapidly as to remain practically cool, so that the temperature of this device would never ordinarily much exceed the temperature of the human body and therefore the device can be used in any place where an ordinary dry battery or series of dry cells are employed.

Instead of using a voltage relay directly connected with a group or groups of the couples which are furnishing current for filament lighting, plate potential or grid biasing, I may in some instances employ an independent series of couples in conjunction with one or a plurality of groups furnishing current, which independent group of couples is connected to a voltage relay in all respects similar to those illustrated in Fig. 1, for example, and which controls the circuit for the heating element for the entire group or groups. In this way, the current employed to operate the relay will not be affected in any way by the current drawn from the controlled group or groups, which might in some instances slightly modify the operation of the relay. This would, however, slightly increase the expense of the device and add somewhat to its size.

While my improved device can be used for production of current, it is, as before stated, particularly applicable for use in connection with wireless telephone or telegraph receiving sets and transmitting mechanism. It will be seen that it is only necessary to connect the heating element with a power supply line which may be the ordinary house current of, say 110 volts, and may be either A. C. or D. C. The heat from the heating element is transmitted through the thin layer of refractory material to the adjacent junctions, 3, of the couples, the excess heat being radiated uniformly and rapidly from the exposed portions of the couples projecting from the blocks, so that the outer junctions, 4, remain at practically uniform temperature very much below that of the interior hot junctions, thus generating an electric current in the couples, which is taken off from the appropriate binding post for filament lighting, plate potential or grid biasing, as the case may be. Should the heating element become so highly heated as to increase the voltage of any of these groups of couples above the voltage for which the regulating device in the power circuit is set, the power circuit will be either broken or the additional resistance will be cut in, as before described, until the temperature falls to that which will produce a predetermined voltage or voltages in the group or groups of couples constituting the particular device. The device is therefore self-regulating and requires no attention whatever. Once installed, it does not require either renewal or recharging. The current produced by each group of couples is uniform at all times and does not vary as the case is with dry batteries and storage batteries after continued discharge. The cost of operation is merely nominal and will not ordinarily exceed in a device designed for a wireless telephone receiver, the expense of operating an ordinary electric light bulb. The device will occupy very much smaller space than the present A, B and C batteries now in use and entirely eliminates the use of both storage batteries and dry cells, and also, in the case of storage batteries, eliminates the accessories for recharging the same where this is done at the point of use.

It will also be seen that in the operation of my improved device, the power current of say, 110 volts, is transformed into the desired voltages for the special requirements of use, as in the example shown in Fig. 1, 6 volts, 90 or 100 volts and 4½ volts of direct current, and if an alternating current is employed as the power source, the alternating current is also transformed into direct current of the desired voltage or voltages. One of the very important results of this apparatus which is especially important in connection with wireless telephony, is the entire absence of noise in the production or generation of the several currents for filament heating, plate potential and grid biasing, so that the operation of the wireless instrument with which these currents are employed is rendered particularly smooth and free from extraneous sound.

What I claim and desire to secure by Letters Patent is:

1. In a thermo electric transformer, the combination with a plurality of thermo electric couples connected in series, and provided with two series of junctions located in two separated lines substantially parallel to each other, of an electric heating element located in close proximity to but electrically insulated from one line of junctions, the other line of junctions, and the portions of the couples adjacent thereto being exposed to the atmosphere to facilitate radiation, and a terminal voltage regulating device in circuit with certain of said couples constructed to vary the heating circuit through the heating element in accordance with variations in the voltage generated in the couples connected therewith, and maintain a substantially constant terminal voltage in all of said couples.

2. In a thermo electric transformer, the combination with a plurality of thermo electric couples connected in series, and provided with two series of junctions located in two separated lines substantially parallel to each other, of an electric heating element located in close proximity to but electrically insulated from one line of junctions, the other line of junctions, and the portions of the couples adjacent thereto being exposed to the atmosphere to facilitate radiation, a current controlling switch in the heating circuit for said heating element, and automatic means for operating said switch to decrease the supply of current to said heating element, when the heat thereof rises to a point producing excessive terminal voltage in said couples, to maintain a substantially constant terminal voltage in said couples.

3. In a thermo electric transformer, the combination with a plurality of thermo electric couples connected in series, and provided with two series of junctions located in two separated lines substantially parallel to each other, of an electric heating element located in close proximity to but electrically insulated from one line of junctions, the other line of junctions, and the portions of the couples adjacent thereto being exposed to the atmosphere to facilitate radiation, and an electromagnetic control device for said heating element operated by variations in the voltage generated by certain of said couples, to maintain substantially uniform terminal voltage in all of said couples.

4. In a thermo electric transformer, the combination with a plurality of thermo electric couples connected in series, and provided with two series of junctions located in two separated lines substantially parallel to each other, of an electric heating element located in close proximity to but electrically insulated from one line of junctions, the other line of junctions, and the portions of the couples adjacent thereto being exposed to the atmosphere to facilitate radiation, a controlling switch in the heating circuit for said heating element, and a voltage relay in circuit with certain of said couples for operating said switch to maintain substantially uniform terminal voltage in all of said couples.

5. In a thermo electric transformer, the combination with a plurality of thermo couples connected in series and having their junctions arranged in two substantially parallel series separated from each other, one series of junctions being enclosed in and supported by refractory material, leaving the other series of junctions and the adjacent portions of said couples exposed to the atmospheric air to facilitate radiation, and an electric heating element supported by said refractory material in close proximity to, but electrically insulated from the enclosed series of junctions of said couples, a regulating switch in circuit with said heating element and comprising a fixed contact, a movable contact, a spring normally tending to hold said contacts in closed position, and a voltage relay for controlling said switch, comprising an armature connected with the movable contact, and an electromagnet for said armature in circuit with certain of said couples.

6. In a thermo electric transformer, the combination with a plurality of thermo electric couples connected in series, and provided with two series of junctions located in two separated lines substantially parallel to each other, of an electric heating element located in close proximity to but electrically insulated from one line of junctions, the other line of junctions, and the portions of the couples adjacent thereto being exposed to the atmosphere to facilitate radiation, a regulating switch in the heating circuit for said heating element comprising a fixed contact, a movable contact, a spring normally tending to hold said contacts in closed position, a resistance adapted to be thrown into said heating circuit by the separation of said contact, a voltage relay for controlling said switch comprising an armature connected with the movable contact, and an electromagnet for said armature in circuit with certain of said couples, and means for adjusting said spring whereby a rise in the terminal voltage of the couples in circuit with said magnet beyond a predetermined point determined by the adjustment of said spring will introduce said resistance into the heating circuit, to mantain a substantially uniform terminal voltage in all of said couples.

7. In a thermo electric transformer, the combination with two sets of thermo electric couples, the couples of each set being connected in series, and said sets being connected in series with each other, the couples of each set having their junctions arranged in two separated lines substantially parallel to each other, a common support of refractory material enclosing one line of junctions of each set of couples, but insulating them from each other, leaving the remaining portions of both sets of couples projecting into the atmosphere to facilitate radiation, an electric heating element in said refractory support between the adjacent lines of terminals enclosed therein, but insulated electrically and thermally therefrom, and a terminal voltage regulating device in circuit with certain of said couples constructed to vary the heating circuit through the heating element in accordance with variations in the voltage generated in the couples connected therewith, and maintain a substantially constant terminal voltage in all of said couples.

8. In a thermo electric transformer, the combination with a plurality of separate groups of thermo couples, the couples of each group being connected in series and having their junctions arranged in two separated lines substantially parallel to each other, a block of refractory insulating material enclosing one line of junctions of the couples of each group, and supporting the remaining portions in the atmosphere to facilitate radiation, a separate heating element for each group of couples supported in the portion of the refractory block adjacent thereto, and insulated electrically and thermally therefrom, each group of couples being constructed to provide a different terminal voltage from that of the other groups, means for connecting said heating elements with a heating current, an independent current controlling device for each heating element, and an electromagnetic controlling means for each of said controlling devices, each being in circuit with certain couples of one group only, and controlling the heating current to the heating element for said group, for automatically maintaining the terminal voltage of the current generated by each group of couples substantially constant.

9. In a thermo electric transformer, the combination with a plurality of separate groups of thermo couples, the couples of each group being connected in series and having their junctions arranged in two separated lines substantially parallel to each other, a common block of refractory insulating material enclosing one line of junctions of the couples of each group, and supporting the remaining portions in the atmosphere to facilitate radiation, a separate heating element for each group of couples supported in the portion of the refractory block adjacent thereto, and insulated electrically and thermally therefrom, a number of couples in each group being different, whereby current of different voltages may be supplied from the different groups of couples, and a common heating circuit for all of said heating elements, an independent current controlling device for each heating element, an electromagnetic controlling means for each of said controlling devices, each being in circuit with certain couples of one group only, and controlling the heating current to the heating element for said group, for automatically maintaining the terminal voltage of the current generated by each group of couples substantially constant.

In testimony whereof I affix my signature.

JOHN H. STEURER.